(12) United States Patent
Gassner et al.

(10) Patent No.: US 9,798,067 B2
(45) Date of Patent: Oct. 24, 2017

(54) LUMINAIRE

(71) Applicant: ZUMTOBEL LIGHTING GMBH, Dornbirn (AT)

(72) Inventors: Patrik Gassner, St. Gerold (AT); Kenneth Martin, Lauterach (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 60 days.

(21) Appl. No.: 14/769,940

(22) PCT Filed: Mar. 25, 2014

(86) PCT No.: PCT/AT2014/000052
§ 371 (c)(1),
(2) Date: Dec. 1, 2015

(87) PCT Pub. No.: WO2014/153578
PCT Pub. Date: Oct. 2, 2014

(65) Prior Publication Data
US 2016/0154168 A1    Jun. 2, 2016

(30) Foreign Application Priority Data

Mar. 28, 2013 (AT) ................. GM102/2013

(51) Int. Cl.
*F21V 8/00* (2006.01)
*F21V 11/02* (2006.01)
(Continued)

(52) U.S. Cl.
CPC .............. *G02B 6/0051* (2013.01); *F21S 4/28* (2016.01); *F21S 8/061* (2013.01); *F21V 3/049* (2013.01);
(Continued)

(58) Field of Classification Search
CPC .... G02B 6/0051; G02B 6/0045; G02B 6/049; G02B 6/0073; F21S 4/28; F21S 8/061;
(Continued)

(56) References Cited

U.S. PATENT DOCUMENTS 7,334,932 B2    2/2008  Klettke
2008/0123031 A1*  5/2008  Homma ............... G02B 5/0221
                                           349/112
(Continued)

FOREIGN PATENT DOCUMENTS

DE          4301340 A1    7/1994
DE     102004020122 A1   12/2005
(Continued)

*Primary Examiner* — Anh Mai
*Assistant Examiner* — Nathaniel Lee
(74) *Attorney, Agent, or Firm* — Volpe and Koenig, P.C.

(57) ABSTRACT

The invention relates to a luminaire (1) having a housing which is closed by a translucent cover (11). The housing accommodates a light source and control gear (6), the light source being formed from a plurality of LEDs (8) arranged on at least one circuit board (9). According to the invention the light from the LEDs (8) is coupled into at least one light guide (7) which extends from the cover (11) towards the LEDs (8). The coupled-in light from the LEDs (8) is guided in the light guide (7) to the cover (11) and is preferably emitted diffusely.

16 Claims, 1 Drawing Sheet

(51) Int. Cl.

| | | |
|---|---|---|
| *F21S 8/06* | (2006.01) | |
| *F21V 3/04* | (2006.01) | |
| *F21V 7/00* | (2006.01) | |
| *F21V 23/00* | (2015.01) | |
| *F21S 4/28* | (2016.01) | |
| *F21Y 103/10* | (2016.01) | |
| *F21Y 115/10* | (2016.01) | |
| *F21Y 107/90* | (2016.01) | |

(52) U.S. Cl.
CPC .......... *F21V 3/0445* (2013.01); *F21V 7/0016* (2013.01); *F21V 11/02* (2013.01); *F21V 23/003* (2013.01); *G02B 6/0045* (2013.01); *G02B 6/0073* (2013.01); *F21Y 2200/00* (2015.01); *F21Y 2103/10* (2016.08); *F21Y 2107/90* (2016.08); *F21Y 2115/10* (2016.08)

(58) Field of Classification Search
CPC ...... F21V 3/0427; F21V 3/0445; F21V 3/049; F21V 7/0016; F21V 11/02; F21V 23/003
See application file for complete search history.

(56) References Cited

U.S. PATENT DOCUMENTS

| | | |
|---|---|---|
| 2011/0051402 A1 | 3/2011 | Keller et al. |
| 2011/0134361 A1 | 6/2011 | Ueno et al. |
| 2012/0169235 A1* | 7/2012 | Dassanayake .......... F21V 3/049 315/113 |
| 2013/0335966 A1 | 12/2013 | Yokota et al. |
| 2014/0254154 A1* | 9/2014 | Catalano ................ F21V 13/10 362/243 |

FOREIGN PATENT DOCUMENTS

| | | | |
|---|---|---|---|
| DE | 102008014317 A1 | 9/2009 | |
| DE | 102010062454 A1 | 6/2011 | |
| DE | 202010008480 U1 | 12/2011 | |
| DE | 202011051669 U1 | 1/2013 | |
| EP | 1729059 A2 | 12/2006 | |
| EP | 2226551 A2 | 9/2010 | |
| EP | 2341278 A2 | 7/2011 | |
| JP | 2012226964 A * | 11/2012 | ................ F21S 8/04 |
| WO | 2012124637 A1 | 9/2012 | |
| WO | 2012144393 A1 | 10/2012 | |
| WO | 2013008221 A1 | 1/2013 | |

* cited by examiner

LUMINAIRE

FIELD OF THE INVENTION

The invention relates to a luminaire.

BACKGROUND

Such luminaires are known and comprise a housing for accommodating a light source and operating devices, said housing being closed by a light-transmissive cover. The use of light emitting diodes as light sources is becoming more and more widespread in lighting technology. Therefore, the light source generally consists of a multiplicity of light emitting diodes arranged on at least one printed circuit board.

As is known, light emitting diodes as electronic components have a very small structural size. By contrast, the space requirement for the operating devices required for the operation of the light emitting diodes, that is to say in particular the electrical driver circuits and the control devices, is relatively large.

SUMMARY

This forms the starting point for the invention. Specifically, it is an object of the invention to provide a luminaire which can be provided with the smallest possible dimensions. This object is achieved by means of a luminaire comprising the features of the independent claim. According to the invention, it is provided that proceeding from a light-transmissive cover in the direction of the light emitting diodes there extends at least one light guide which takes up the light emitted by the light emitting diodes and guides it toward the cover. By virtue of the fact that a light guide is provided, space is provided for operating devices in order to arrange the latter alongside the light guide. As a result, it is possible for the light coupled into the light guide to be guided past the operating device and introduced into the cover, which then emits the light into the surroundings of the luminaire via an emission surface situated opposite the coupling-in side.

Advantageous configurations of the invention are described in the dependent claims.

In a first embodiment, the luminaire according to the invention is substantially elongated and the housing has two profiled side walls and two end parts. The light emitting diodes are arranged in two rows running parallel to one another on the printed circuit board, wherein a light guide is respectively assigned to a row of light emitting diodes.

In one preferred embodiment, cover and light guides form a U-shape as viewed in cross section, wherein the light guides define lateral flanks and the cover defines the crossbar of the U-shape. In order to be able to function optimally as light guides, the lateral flanks are produced from transparent material. With particular preference, the crossbar is produced from material which emits light diffusely. This is of importance because shadow casting and the imaging of bright light stripes on the area to be illuminated are intended to be avoided. The cause of shadow casting is, firstly, that two light guides are provided in the embodiment discussed, from which light guides light emerges via the cover and is partly incident on the suspension elements of the luminaire. Secondly, a multiplicity of light emitting diodes are provided, each of which by itself forms a small light source, which in turn illuminate the suspension elements from different directions on account of their different positions on the printed circuit board. This leads to multiple shadows that are generally perceived as disturbing or unattractive.

The cause of the imaging of bright light stripes can be seen in the fact that the light guides can be arranged approximately perpendicular to the cover and, as a result, a large portion of the light guided in the light guide impinges on the exit surface of the cover at a very steep angle and is therefore hardly deflected upon emerging from the cover. Without the targeted intervention by the formation of a diffusely emitting emission surface of the cover, this arrangement has the result that light stripes are imaged in a clearly visible manner, which would in turn generally be perceived as disturbing or unattractive. Further improvement with regard to the reduction of shadow casting and the reduction of the imaging of light stripes can be achieved by virtue of the fact that the crossbar of the cover is inclined in the region of the lateral flanks relative to the crossbar. In particular, in an advantageous manner, the crossbar projects beyond the lateral flanks and in this case forms projections that are inclined in the manner mentioned.

Some of the dependent claims describe various developments of the cover which are suitable for ensuring diffuse emission of the light. This can be achieved, inter alia, by means of a surface exhibiting small angle scattering, that is to say a surface that is preferably roughened or embodied in a wavy fashion. Alternatively, the material properties from which the cover is produced can be chosen in such a way that light is emitted diffusely. This can be realized for example with poly (methyl methacrylate) admixed with a proportion of diffuser bead material of approximately 20%.

In an advantageous manner, the space enclosed by the lateral flanks and by the crossbar is utilized for accommodating operating devices. An embodiment of the invention having a particularly small structural size can be realized as a result. Preferably, cover and light guides are produced integrally from plastic in the two-component injection molding method.

One particularly preferred embodiment of the luminaire according to the invention is described in other dependent claims. In this case, the luminaire is embodied as a surface-mounted or pendant luminaire and comprises two light sources which are formed from a multiplicity of light emitting diodes, the light of which is emitted into the surroundings via two emission surfaces. In this case, the light sources are arranged on a common printed circuit board, wherein the multiplicity of the light emitting diodes of the first light source are positioned on the top side and the multiplicity of the light emitting diodes of the second light source are positioned on the underside of the printed circuit board. Preferably, the light of the first light source serves for indirect lighting and the light of the second light source serves for direct lighting. In this case, indirect lighting should be understood to mean that light is predominantly emitted toward a wall or, in particular, toward a ceiling and is directed from there only by reflection into the room or region to be illuminated. Direct lighting should be understood to mean that the region to be illuminated, for example a workstation, is illuminated directly from the luminaire. Advantageously, the first light source can be switched or dimmed separately from the second light source in order thus to make the direct or indirect lighting separately operable. In one development according to the invention, the second light source is formed by at least one row of a plurality of light emitting diodes which are arranged one behind another and which are positioned centrally on the printed circuit board, wherein the light emitting diodes are covered by a lens optical unit, which emits the light that has passed through it into a grid optical unit. In order to improve the efficiency further, the at least one row of a plurality of light emitting diodes arranged one behind another of the second light source can be surrounded by a reflector. Preferably, the grid optical unit is embodied as an aluminum grid having side reflectors and transverse lamellae of the kind in EP2226551 in the name of the applicant or as a plastic cell grid of the kind in DE102010062454 in the name of the applicant.

DETAILED DESCRIPTION OF THE PREFERRED EMBODIMENTS

Figure 1:
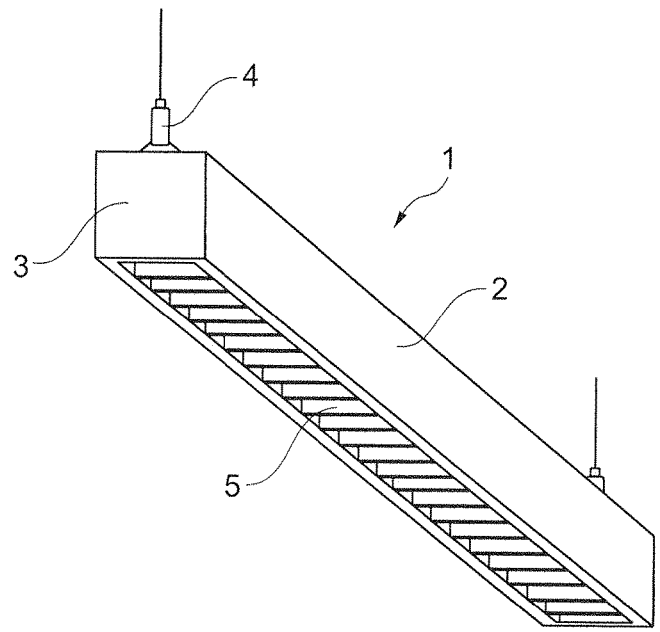
FIG. 1 shows a perspective view of a luminaire according to the invention.

FIG. 1 shows a luminaire (1) embodied as a pendant luminaire. The luminaire (1) comprises a housing having side walls (2) and end parts (3). Light is emitted from the luminaire (1) via a grid (5), which is embodied as a plastic cell grid. The luminaire (1) is mounted on a ceiling (not illustrated) by means of so-called cable pendants (4).

Figures 2, 3:
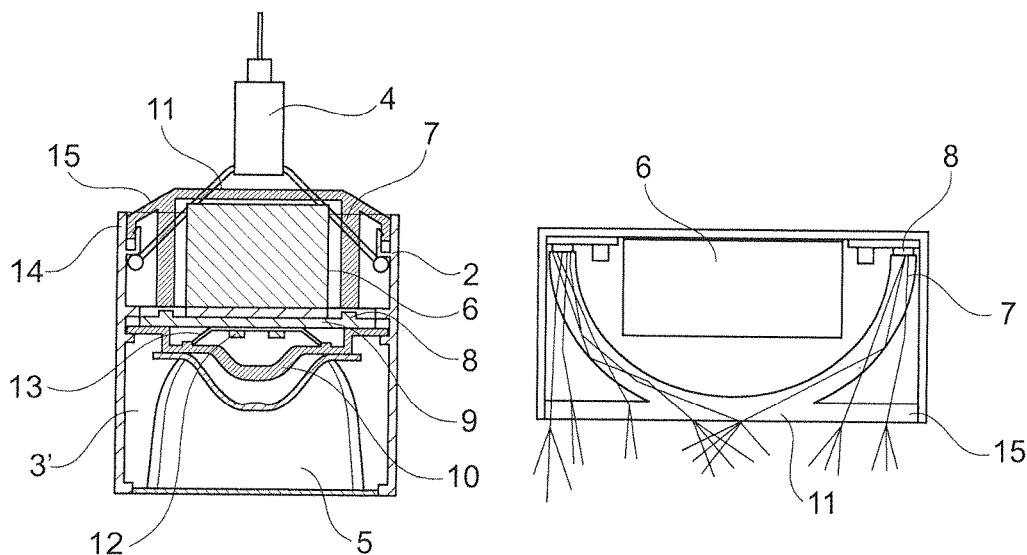
FIG. 2 shows the cross section through a luminaire according to the invention in accordance with FIG. 1.
FIG. 3 shows an alternative embodiment of a luminaire according to the invention.

FIG. 2 illustrates a luminaire (1) according to the invention in the embodiment in accordance with FIG. 1. It is evident that, besides the direct light emission via the grid (5), light is also emitted via the cover (11) to a ceiling (not illustrated). For this purpose, light emitting diodes (8) are arranged on a printed circuit board (9), said light emitting diodes being arranged in such a way that they radiate their light into light guides (7) arranged directly above them. This light is guided in the light guide (7) to a cover (11), from where it is emitted into the surroundings via an emission surface. The cover (11) together with the light guides (7) forms, as viewed in cross section, a U-shape composed of a crossbar and lateral flanks, wherein the cover (11) projects laterally beyond the light guides (7). As a result, projections (15) are formed which are arranged in an angular fashion relative to the plane in which the cover (11) lies. This angularity results in the advantageous effect that the emission of the light is expanded and, consequently, a larger region of the ceiling (not illustrated) is illuminated than would be the case if the angularity were not present. The cover (11) and also the light guides (7) or the crossbar, the lateral flanks and the projections (15), are embodied as a plastic profile and thus form a structural unit. This structural unit is connected as a whole to the side walls (2) of the luminaire housing. For this purpose, the structural unit has snap-action strips (14) at the end of the projections (15), said strips being respectively snapped into assigned first grooves of the side walls.

The printed circuit board (9) is populated with light emitting diodes (8, 12) on both sides. The light emitting diodes (12) serving for direct lighting are covered by a lens profile (10), which, just like the printed circuit board itself, are held in second grooves integrally formed on the side walls. The light emitted by the light emitting diodes (12) into the cell grid (5) via the lens profile (10) is deflected by said grid in such a way that the luminaire (1) is provided with suppression of glare and fulfills the relevant standards for workspace lighting. In order to improve the efficiency, a reflector is arranged laterally alongside the light emitting diodes (12), said reflector ensuring that as far as possible a large portion of the light of the light emitting diodes (12) is emitted in the direction of the lens profile (10).

FIG. 3 shows an alternative embodiment of a luminaire according to the invention, having a particularly small structural size. A printed circuit board with light emitting diodes (8) is arranged in a luminaire housing, the light of said light emitting diodes in turn being coupled into a light guide (7). However, said light guide (7) differs from the flank-like embodiment of the light guides as described in FIGS. 1 and 2, since the light guide (7) now has an arcuate shape. In this case, the arc formed by the light guide (7) spans the printed circuit board. An operating device (6) is arranged in the space spanned by the arc.

The light of the light emitting diodes (8), which are arranged in two rows on both lateral edge regions of the printed circuit board, is guided to the cover (11), from where it is emitted into the surroundings via an emission surface. In this case, it is possible for a small portion of the light to emerge from the light guide (7) prematurely. This is unproblematic however, because this light, too, is substantially directed toward the cover (11) and consequently passes through the cover (11) and is likewise emitted into the surroundings via the emission surface.

The invention claimed is:

1. A luminaire, comprising a housing for accommodating a light source and operating devices, said housing being closed by a light-transmissive cover,
wherein the light source is formed from a multiplicity of light emitting diodes arranged on at least one printed circuit board, proceeding from the cover in the direction of the light emitting diodes there extends at least one light guide which takes up light emitted by the light emitting diodes and guides the light toward the cover, and wherein the luminaire comprises at least two light sources which are formed from a multiplicity of light emitting diodes, the light of which is emitted into the surroundings via two emission surfaces, the light sources are arranged on a common printed circuit board, the multiplicity of the light emitting diodes of a first light source are positioned on a top side and the multiplicity of the light emitting diodes of a second light source are positioned on an underside of the printed circuit board, the second light source being formed by at least one row of a plurality of light emitting diodes which are arranged one behind another and which are positioned centrally on the printed circuit board, and the light emitting diodes are covered by a lens optical unit, which emits the light that has passed through it into a grid optical unit.

2. The luminaire as claimed in claim 1, wherein the at least one light guide introduces the light coupled into it into the cover, which emits the light into the surroundings via an emission surface situated opposite a side into which the light is coupled.

3. The luminaire as claimed in claim 1 wherein: the luminaire is substantially elongated, the housing has two profiled side walls and two end parts, the light emitting diodes are arranged in two rows running parallel to one another on a printed circuit board, two light guides are provided, which are respectively assigned to a row of light emitting diodes.

4. The luminaire as claimed in claim 3, wherein the cover and light guides form a U-shape as viewed in cross section, wherein the light guides define lateral flanks and the cover defines a crossbar, wherein the lateral flanks are produced from transparent material and the crossbar is produced from material which emits light diffusely on account of properties or surface structure thereof.

5. The luminaire as claimed in claim 4, wherein cover and light guides are produced integrally from plastic in a two-component injection molding method.

6. The luminaire as claimed in claim 4, wherein the space enclosed by the lateral flanks and by the crossbar serves to accommodate operating devices.

7. The luminaire as claimed in claim 4, wherein the crossbar of the cover projects beyond both lateral flanks, and the projections formed in this case are inclined relative to the crossbar.

8. The luminaire as claimed in claim 1, wherein the cover is configured with regard to lighting effectiveness in such a way that light is emitted diffusely.

9. The luminaire as claimed in claim 8, wherein the cover is produced from clear poly (methyl methacrylate) containing a quantitative proportion of diffuser bead material.

10. The luminaire as claimed in claim 9, wherein the quantitative proportion of the diffuser bead material is approximately 20%.

11. The luminaire as claimed in claim 8, wherein the cover has optically effective imperfections on the emission surface, said imperfections being applied by laser engraving, by printing methods or by mechanical processing.

12. The luminaire as claimed in claim 1, wherein a first light source radiates its light into the light guides of the cover.

13. The luminaire as claimed in claim 1, wherein the at least one row of a plurality of light emitting diodes arranged one behind another of the second light source are surrounded by a reflector, which directs the light thereof to the lens optical unit.

14. The luminaire as claimed in claim 1, wherein the grid optical unit is embodied as an aluminum grid having side reflectors and transverse lamellae or as a plastic cell grid.

15. The luminaire as claimed in claim 1 the luminaire is embodied as a surface-mounted or pendant luminaire, wherein the light of the first light source serves for indirect lighting and the light of the second light source serves for direct lighting.

16. The luminaire as claimed in claim 15, wherein the first light source can be switched or dimmed separately from the second light source.

* * * * *